US007991840B2

(12) United States Patent
Boyer et al.

(10) Patent No.: US 7,991,840 B2
(45) Date of Patent: Aug. 2, 2011

(54) SYSTEM AND PRODUCT FOR ROLE-BASED TAG MANAGEMENT FOR COLLABORATIVE SERVICES INTEGRATED WITHIN AN SOA

(75) Inventors: John E. Boyer, Seattle, WA (US); Peter A. Coldicott, Jonestown, TX (US); Edward E. Kelley, Wappingers Falls, NY (US); Eoin Lane, Littleton, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 12/019,074

(22) Filed: Jan. 24, 2008

(65) Prior Publication Data

US 2009/0193096 A1 Jul. 30, 2009

(51) Int. Cl.
*G06F 15/16* (2006.01)
(52) U.S. Cl. ......... 709/205; 709/204; 709/217; 707/608
(58) Field of Classification Search .................. 709/204, 709/205, 217; 707/608
See application file for complete search history.

(56) References Cited

U.S. PATENT DOCUMENTS

| 7,213,030 B1* | 5/2007 | Jenkins | 1/1 |
| 2006/0041582 A1* | 2/2006 | Hekmatpour | 707/102 |
| 2006/0053195 A1* | 3/2006 | Schneider et al. | 709/204 |
| 2007/0112913 A1* | 5/2007 | Bales | 709/204 |
| 2007/0198506 A1* | 8/2007 | Rezaei et al. | 707/5 |
| 2007/0255781 A1* | 11/2007 | Li et al. | 709/201 |
| 2008/0147790 A1* | 6/2008 | Malaney et al. | 709/203 |
| 2008/0184336 A1* | 7/2008 | Sarukkai et al. | 726/1 |
| 2009/0024585 A1* | 1/2009 | Back et al. | 707/3 |
| 2009/0070128 A1* | 3/2009 | McCauley et al. | 705/1 |

* cited by examiner

*Primary Examiner* — William C Vaughn, Jr.
*Assistant Examiner* — Boris Gorney
(74) *Attorney, Agent, or Firm* — Cantor Colburn LLP

(57) ABSTRACT

A tag management system for a user of a client-side portal application providing access to a set of services that include provisions for collaborative tagging of content comprises one or more data repositories configured to maintain one or more separate sets of tags, a messaging intermediary configured to provide access to the one or more data repositories and to provide for communication with the set of services, and a client-side agent configured to communicate with the set of services and access the one or more data repositories through the message intermediary to act on instructions provided by the user in one or more user roles. A set of tags corresponds to each service in each user role and specifies an available vocabulary for tagging content at that service. The agent is configured to access the one or more data repositories to load a first set of tags corresponding a user-specified service and a user-specified role, display the first set of tags to the user, and to communicate with the user-specified service to post tags selected by the user from the first set of tags to content at the user-specified service.

20 Claims, 3 Drawing Sheets

SYSTEM AND PRODUCT FOR ROLE-BASED TAG MANAGEMENT FOR COLLABORATIVE SERVICES INTEGRATED WITHIN AN SOA

BACKGROUND OF THE INVENTION

1. Field of the Invention

This invention relates to service-oriented architectures, and more particularly, to collaborative tagging for services integrated within an SOA.

2. Description of Background

Service Oriented Architecture (SOA) is a development of distributed computing and modular programming in which existing or new technologies are grouped into atomic systems. SOAs use software services to build applications. Services are relatively large, intrinsically unassociated units of functionality with externalized service descriptions. In an SOA environment, one or more services communicate with one another by passing data from one service to another, or coordinating an activity between one or more services. In this manner, atomic services can be orchestrated into higher-level services. The architecture defines protocols that describe how services can talk to each other, and independent services can be accessed without knowledge of the underlying platform implementation.

A current challenge in SOA development is to build business driven composite services atop of atomic informational services. By defining a methodology for the use and re-use of software services and business processes, which typically encompass multiple service invocations, SOA has the potential to provide a great deal of flexibility and cost savings to enterprises that rely on IT.

The SOA concept is based upon an architectural style that defines an interaction model between three primary building blocks: a) a service provider, which publishes a service description and provides the implementation for the service; b) a service requester, which can either use the uniform resource identifier (URI) for the service description directly or find the service description in a service registry and bind and invoke the service; and c) a service broker, which provides and maintains the service registry using, for example, the Universal Description Discovery and Integration (UDDI) specification, which defines a way to publish and discover information about web services.

A web service is a software application designed to support interoperable machine-to-machine interaction over a network, and is frequently simply Web APIs that can be accessed over a network, such as the Internet, and executed on a remote system hosting the requested services. Web services can provide an example of an SOA implementation in which the basic unit of communication is a message, rather than an operation, by making functional building blocks accessible over standard Internet protocols that are independent from platforms and programming languages.

"Web 2.0" is a term used to refer to an increasingly frequented type of web application that is primarily distinguished by the ability of visitors to continually contribute information for collaboration and sharing. Web 2.0 applications use web services and may include composite user interfaces that provide combinations of various service technologies such collaborative and social software, Web syndication, weblogs, and wikis. While there are no set standards for Web 2.0, it is a user-driven architecture of participation that utilizes the SOA characteristics of building on the existing architecture and using services. The evolving technology infrastructure of Web 2.0 includes various applications that can provide users with information storage, creation, and dissemination capabilities that go beyond what had formerly been expected of web applications.

A number of Web 2.0 applications feature the extensive use of folksonomies. A folksonomy involves the practice of collaborative categorization using freely-chosen tags, that is, metadata in the form of descriptive keywords or terms associated with or assigned to a piece of information, and arises in Web applications in which special provisions are made at the site level for creating and using tags for web content. Collaborative tagging in this fashion is intended to enable a body of information to be increasingly easy to search, discover, and navigate over time, and folksonomies are commonly used to label, classify, and retrieve web content such as web pages, digital images, internet bookmarks, and web links. As folksonomies develop in web-mediated social environments, users often discover the tag sets of another user who tends to interpret and tag content in a way that makes sense to them. This can result in an immediate and rewarding gain in user capacity to find related content.

Flickr and del.icio.us are examples of websites that use folksonomic tagging to organize content. Flickr is a digital image storage and management service that allows the user through a user interface to tag images with descriptive nouns, verbs, and adjectives and systematically perform CRUD (create, read, update, and delete) operations on photography entries. del.icio.us is a social bookmarking site that allows users to create and store Internet bookmarks and then tag them with many descriptive words, allowing others to search by those terms to find sites that have been found useful.

Within the realm of a business enterprise and its network of partners, there are numerous opportunities for collaboration. The use of Web 2.0 technologies and SOA principles has the potential to increase the reach and improve the richness of this interaction in enterprise informational services, leading to easier development of new business models and processes by using readily available, intuitive modular elements. By creating an environment in which employees can collaborate efficiently by leveraging each other's intellect and resources, employees can create stronger and more successful products. Nevertheless, most software that is touted as enabling enterprise collaboration is difficult to use, cumbersome, and does not adequately empower employees to share their content. This results in SOA implementations that undesirably add more custom logic and increased complexity to an IT infrastructure. A big hurdle for the typical large enterprise is the ability to standardize knowledge practice across that enterprise and to implement tools and processes that support that aim.

An example of an enterprise or business-driven collaborative enterprise environment is that of a composite service system, which comprises a collection of collaborative or interactive services for which aggregate domain-specific (or context-aware) content information is intended be utilized by employees to maintain consistency across all of the enterprise informational services. Examples of systems that could be implemented in this fashion include project management systems, which are used to schedule, track, and chart the steps in a project as it is being completed, workflow systems, which enable the collaborative management of tasks and documents within a knowledge-based business process, and knowledge management systems, which are used to collect, organize, manage, and share various forms of information. Operations such as record management, content management, collaborative software, workflow or business process management, and other mechanisms designed to capture the efforts of many into a managed content environment are typical of these workplace collaboration technologies.

Domain knowledge is the body of knowledge about a particular activity environment. In an enterprise, domain knowledge has traditionally been organized (formally or informally) in an institutionally supported taxonomy that is domain-specific. Domain knowledge may be kept in data repositories such as Lotus Notes Teamrooms, ad-hoc websites, knowledgebases, social bookmarks, or applications, and so on. A workplace-generated folksonomy would be useful, for example, with business-driven collaborative or interactive management systems of composite services that are designed to help employees working on a common task achieve their goals.

Nevertheless, use the unsystematic methodology of folksonomic tagging may be unreliable and inconsistent for use in large enterprises. Typically, there is no information about the meaning or semantics of a tag, and because of the lack of a hierarchical or systematic structure for the tagging system, the terms often fail to show their relationship to other objects of the same or similar type, or lead to irrelevant connections between objects. In a situation in which a user in a collaborative or social software environment has found a new, important piece of information, or has posted new content relevant to the community on an external collaborative software application, the user can only employ existing folksonomies or create a tag on-the-fly, which may not be consistent with the domain-specific taxonomy. Thus, while this user will be aware of the new object, other users in the same environment will not encounter this new information when performing tag searches using, for example, a feed reader.

If a tagging system is informally defined, continually changing, and lacking governance, it will be burdensome to use the tags so constructed to automate workflow and business processes, and tags associated with resources could grow to unruly proportions. Keeping track of this information is challenging and, as the use of collaborative and social software increases both internally (that is, within a corporate firewall) and externally (or publicly), the issue of synchronizing tagged information between the public and private spaces becomes a greater concern, as the public social software applications are not aware of the private domain specific tags or taxonomies.

SUMMARY OF THE INVENTION

The shortcomings of the prior art can be overcome and additional advantages can be provided through exemplary embodiments of the present invention that are related to a tag management system for a user of a client-side portal application providing access to a set of services that include provisions for collaborative tagging of content. The tag management system comprises one or more data repositories configured to maintain one or more separate sets of tags for the user, a messaging intermediary configured to provide access to the one or more data repositories and to provide for communication with the set of services, and a client-side agent configured to communicate with the set of services and access the one or more data repositories through the message intermediary to act on behalf of the user in one or more user roles. The sets of tags include a set of tags corresponding to each service of the set of services in each role of the one or more user roles and specifying an available vocabulary for tagging content at that service. The agent is configured to act on instructions provided by the user to access the one or more data repositories to load a first set of tags corresponding a user-specified service and a user-specified role, display the first set of tags to the user, and to communicate with the user-specified service to post tags selected by the user from the first set of tags to content at the user-specified service.

The shortcomings of the prior art can also be overcome and additional advantages can also be provided through exemplary embodiments of the present invention that are related to computer program products and data processing systems corresponding to the above-summarized system are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to provide a mechanism for maintaining separate, distinct sets of application-specific and group domain-specific tags for a user in an SOA environment or model that is designed to provide user access to integrated tag-based services and process that include features for collaborative tagging of web content. In exemplary embodiments, the mechanism can be configured to maintain a distinct tag set for each of a number of separate identities or roles that the user may desire to take on in the SOA environment.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented to provide a mechanism for maintaining separate, distinct sets of application-specific and group domain-specific tags for a user in an SOA environment or model that is designed to provide user access to integrated tag-based services and process, such as Web 2.0 applications that include features for collaborative tagging of web content. In exemplary embodiments, the mechanism can be configured to maintain a distinct tag set for each of a number of separate identities or roles that the user may desire to take on in the SOA environment.

Figure 1:
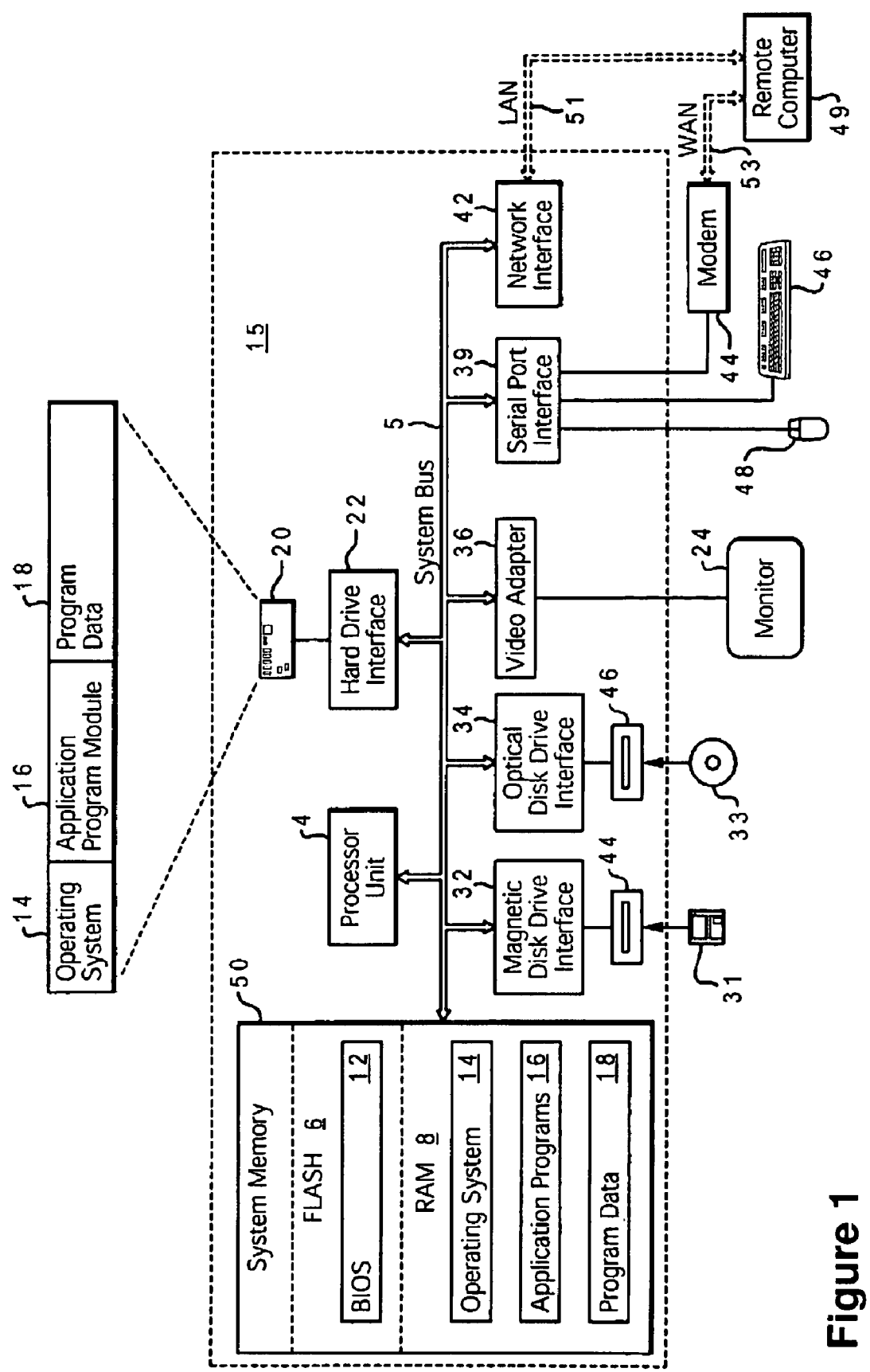
FIG. 1 is a block diagram illustrating an exemplary computer system that may be utilized to implement exemplary embodiments of the present invention.

FIG. 1 and the following discussion are intended to provide a general description of an exemplary data processing system that can be adapted to implement exemplary embodiments of the present invention. While exemplary embodiments of the present invention will be described in the general context of an application program that runs on an operating system in conjunction with a personal computer, those skilled in the art will recognize that exemplary embodiments may also be implemented in combination with other program modules such as, for example, platform software modules, user-written software modules (such as spreadsheet templates, word processor macros, graphics scripts, etc.), routines, programs, components, data structures, etc. that perform particular tasks or implement particular abstract data types. Moreover, those skilled in the art will appreciate that exemplary embodiments of the present invention may be practiced with other computer system configurations, including hand-held devices, multi-processor systems, microprocessor-based or programmable consumer electronics, minicomputers, mainframe computers, and the like, as well as in distributed computing environments where tasks are performed by remote processing devices that are linked through a communications network. In a distributed computing environment, program modules may be located in both local and remote memory storage devices.

Referring now to FIG. 1, there is depicted an exemplary data processing system 15 that may be utilized to implement exemplary embodiments of the present invention. For discussion purposes, the data processing system is described as having features common to a personal computer, such as a desktop or portable computer. As used herein, however, the terms "data processing system," "computer," and the like are intended to mean essentially any type of computing device or machine that is capable of receiving, storing, and running a software product, including such devices as communication devices (for example, pagers, telephones, electronic books, electronic magazines and newspapers, etc.) and personal and home consumer devices (for example, handheld computers, Web-enabled televisions, home automation systems, multimedia viewing systems, gaming consoles, etc.).

Data processing system 15, as provided in FIG. 1, is configured as a personal computer that generally includes a processing unit 4, a system memory 50, and a system bus 5 that couples system memory 50 to processing unit 4. The system memory 50 includes flash memory 6 and random access memory (RAM) 8. Flash memory 6 is an electrically erasable programmable read only memory (EEPROM) module that includes a basic input/output system (BIOS) 12. BIOS 12 contains the basic routines that facilitate transfer of information between elements within personal computer 15, such as during start-up.

Data processing system 15 further includes a hard disk drive 20, a magnetic disk drive 44 (which can be used to read from or write to a removable disk 31), and an optical disk drive 46 (which can be used to read a CD-ROM disk 33 or read or write to other optical media). Hard disk drive 20, magnetic disk drive 44, and optical disk drive 46 are communicatively coupled to system bus 5 by a hard disk drive interface 22, a magnetic disk drive interface 32, and an optical drive interface 34, respectively. The drives and their associated computer-readable media provide nonvolatile storage for data processing system 15. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments.

A number of program modules may be stored in the drives and RAM 8, including an operating system 14, application program modules 16 (such as, for example, word processors, design applications, and IBM's Workplace Forms suite of program modules), and program data 18. A user may enter commands and information into data processing system 15 through a keyboard 46 and a mouse 48. Other input devices (not shown) may include, for example, a microphone, joystick, game pad, satellite dish, scanner, or the like. These and other input devices are often connected to processing unit 4 through a serial port interface 39 that is coupled to system bus 5, but may be connected by other interfaces, such as a game port or a universal serial bus (USB). A monitor 24 or other type of display device is also connected to system bus 5 via an interface, such as a video adapter 36. In addition to the monitor, the exemplary computer operating environment may also include other peripheral output devices (not shown), such as speakers or printers.

Data processing system 15 may operate in a networked environment using logical connections to one or more remote computers, such as a remote computer 49. Remote computer 49 may be, for example, a server, a router, a peer device, or another common network node, and may include many or all of the elements described in relation to data processing system 15. The logical connections depicted in FIG. 1 include a local area network (LAN) 51 and a wide area network (WAN) 53.

When used in a LAN networking environment, data processing system 15 is connected to LAN 51 through a network interface 42. When used in a WAN networking environment, data processing system 15 includes a modem 44 or other means for establishing communications over WAN 53, such as the Internet. Modem 44, which may be internal or external to data processing system 15, is connected to system bus 5 via serial port interface 39. In a networked environment, program modules depicted relative to data processing system 15, or portions thereof, may be stored in the remote memory storage device. It will be appreciated that the network connections shown are exemplary and other means of establishing a communications link between the computers may be used.

Exemplary embodiments of the present invention may be implemented in conjunction with an SOA environment such as, for example, an integrated web services implementation, in which the SOA supports integration and consolidation of any number of services and processes. Web services are self-contained, self-describing, modular applications that can be described, located, and invoked over a computer network such as the World Wide Web. Web services utilize standardized interfaces and protocols (for example, a Web Application Programming Interface (API)) to implement consolidation and integration methods that allow different entities or web-based applications to communicate data, logic, and processes with one another over a network. These standardized methods permit different applications to exchange resources with other entities or applications that are running on different operating systems. In an SOA environment, the SOA can define a interface through which a service-requesting or client-side party may access web services or enterprise-based services provided within an enterprise domain, specify or consolidate a set of web services or web service providers that may be invoked through the interface, and define protocols for communicating with the set of web services through the SOA interface.

Figure 2:
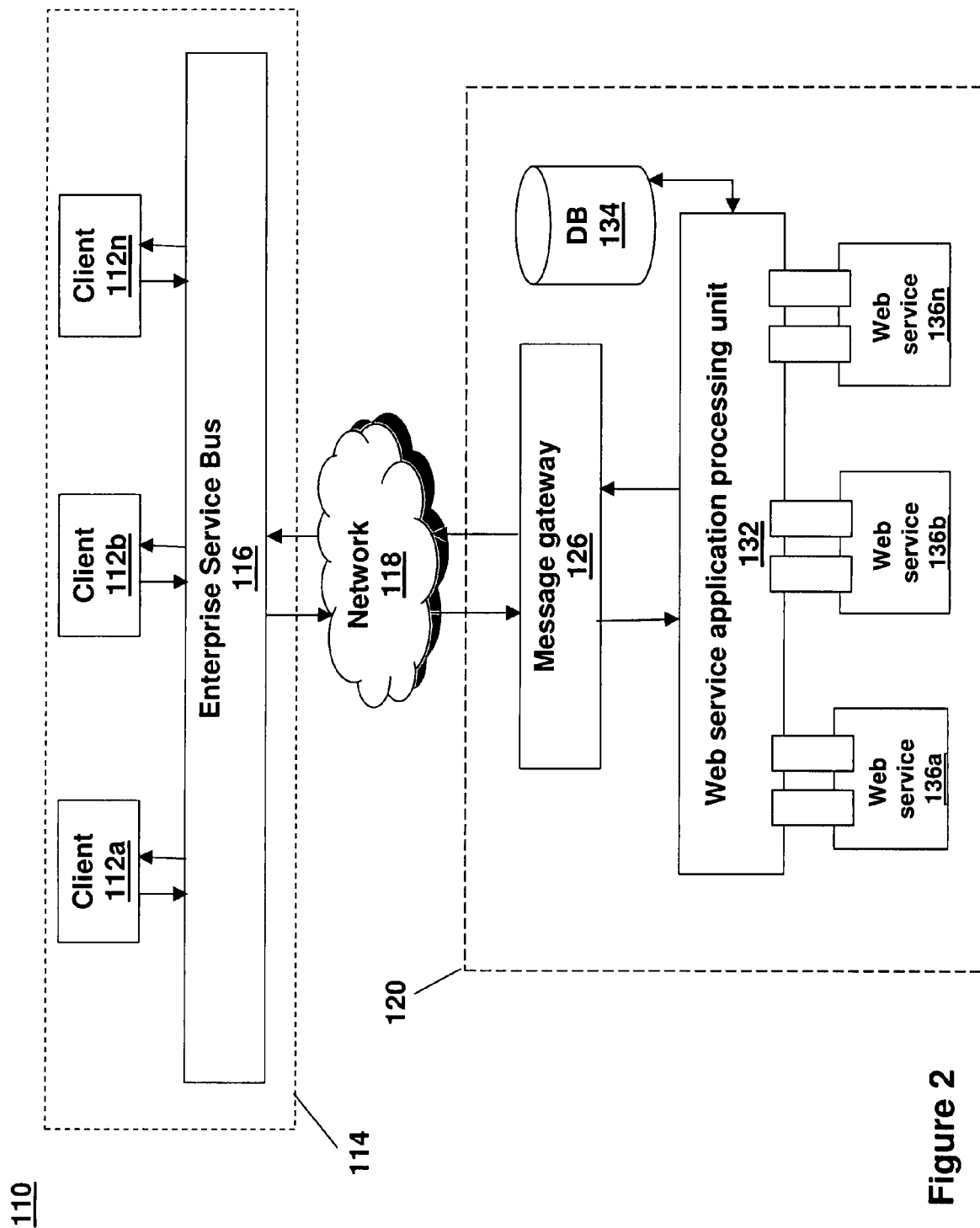
FIG. 2 is a block diagram illustrating an operational configuration of an exemplary embodiment of an SOA web service system.

FIG. 2 is a block diagram illustrating an exemplary embodiment of an SOA web service system 110 within which exemplary embodiments of the present invention may be implemented and operate in a collaborative environment such as that of a business enterprise. Web service system 110 allows for the exchange or transport of web service data or web service messages between multiple client applications (112a, 112b-112n) within an enterprise domain 114 to any of multiple web services (136a, 136b-136n) hosted by a web service application server or provider 120 using an enterprise service bus (ESB) 116. In exemplary embodiments, web service system 110 may allow for the exchange or transport of web service data or web service messages between client applications 112 and a number of web service application providers that each host one or more web services over a communications network 118.

Client applications 112 are software applications that include one or more sequences of instructions that are executable by one or more processors. For example, applications 112 may be programs that are executable on a computer system such as the data processing system illustrated in FIG. 1, described above. Web services 136 may include some combination of programming and data that are made available through application server 120 for end users and other network-connected application programs. In exemplary embodiments, web services 136 may comprise one or more web applications that are implemented to allow users of client applications 112 to communicate therewith to create and store folksonomic tags for describing web content such as, for example, digital images or internet bookmarks.

When a client application needs to invoke a remote web service at application server 120, the invoking client application generates a request message describing arguments to be given to the web services, and requests processing by the web services. Upon receiving the request message, application server 120 performs the processing for the requested web services, and returns a response message describing any return values of the processing to the client application.

ESB 116, which is a component of enterprise domain 114 in the present exemplary embodiment, serves to provide an enhanced messaging middleware infrastructure for the enterprise domain and provides the set of capabilities through which the SOA may be implemented. The capabilities provided by ESB 116 may include, for example, invocation, routing, mediation, messaging, mediation, messaging, process choreography, service orchestration, complex event processing, and management functions. In general, ESB 116 serves as a centralized broker that handles issues relating to security, access, and communication in the SOA environment. In exemplary embodiments, ESB can be configured to perform data integration to ensure that information is kept consistent within the SOA environment, provide a common user interface through which client applications 112 can access the web services that are specified by the SOA, and to extract policies or rules from the specified web services so that if one service is replaced with a different vendor's services in the SOA specification, the business rules do not have to be re-implemented. In alternative exemplary embodiments, ESB 116 can be vendor-provided service bus that is external to enterprise domain 114.

In one particular exemplary capability, ESB 116 serves as a message mediator by receiving, processing, and passing request messages from client applications 112 and response messages from web services 136 such that the services can be called to perform their tasks in a standard way, without the services having foreknowledge of the calling client applications, and without the client applications having or needing knowledge of how the services actually perform their tasks. In exemplary embodiments, the message processing performed by ESB 116 may be built upon generally accepted web services standards and protocols such as, for example, XML (a markup language for describing data in message payloads in a document format), HTTP (or HTTPS, a request/response protocol between clients and servers used to transfer or convey information), SOAP (a protocol for exchanging XML-based messages over a computer network, normally using HTTP), and XACML (a markup language for expressing access control rules and policies).

ESB 116 and web services 136 communicate with each other, as well as with other applications and web service systems, through network 118. Network 118 is configured to receive and pass on request and response messages accordingly, and to use the transportation protocol or protocols used by messages. Network 118 includes intranets, extranets, and the Internet, and may contain any number of network infrastructure elements including routers, switches, gateways, etc. For example, network 118 may be the public Internet or a private LAN. In exemplary embodiments, ESB 116 may also communicate with other web service providers to provide other web services and applications through network 118 to client applications 112, as well as with enterprise service providers through an intranet within enterprise domain 114 that provide other services and processes such as enterprise legacy services to the client application.

Application server 120 provides web services 136 to client applications 112 through network 118. A web server application processing unit 132 (such as WebSphere, a product of International Business Machines Corporation) oversees the execution of multiple web services 136a, 136b-136n that reside on application server 120. Network 118 passes each request message to and receives each response message from application processing unit 132 through a message gateway 126 such as, for example, a proxy, firewall, or other message intermediary. Message gateway 126 receives request messages from network 118 and passes response messages to the network. Message gateway 126 performs lexical analysis of request messages to create input objects including parameters for invocation of one or more of web services 136. Message gateway 126 sends input objects to web service application processing unit 132, which calls the appropriate web services that correspond to the method invocation of the input objects, executes the appropriate logic, and returns the result as output objects that include the return values of the invoked web service(s), to the message gateway. Message gateway 126 converts output objects into response messages, and transmits the response messages through network 118 to the invoking client applications.

Application processing unit 132 may also be supported by a database management system 134, which may be any conventional data repository for storing, managing, and retrieving data. In exemplary embodiments, database 134 may be a relational or object-relational database management system, such as DB2, a product of International Business Machines Corporation. In exemplary embodiments, database 134 may be internal to application server 120 (as shown in FIG. 2) or, alternatively, reside externally on a separate machine. In exemplary embodiments, application server 120 may use a single database 134 to serve multiple web services 136 (as shown in FIG. 2) or, alternatively, use a separate database for each separate web service.

Figure 3:
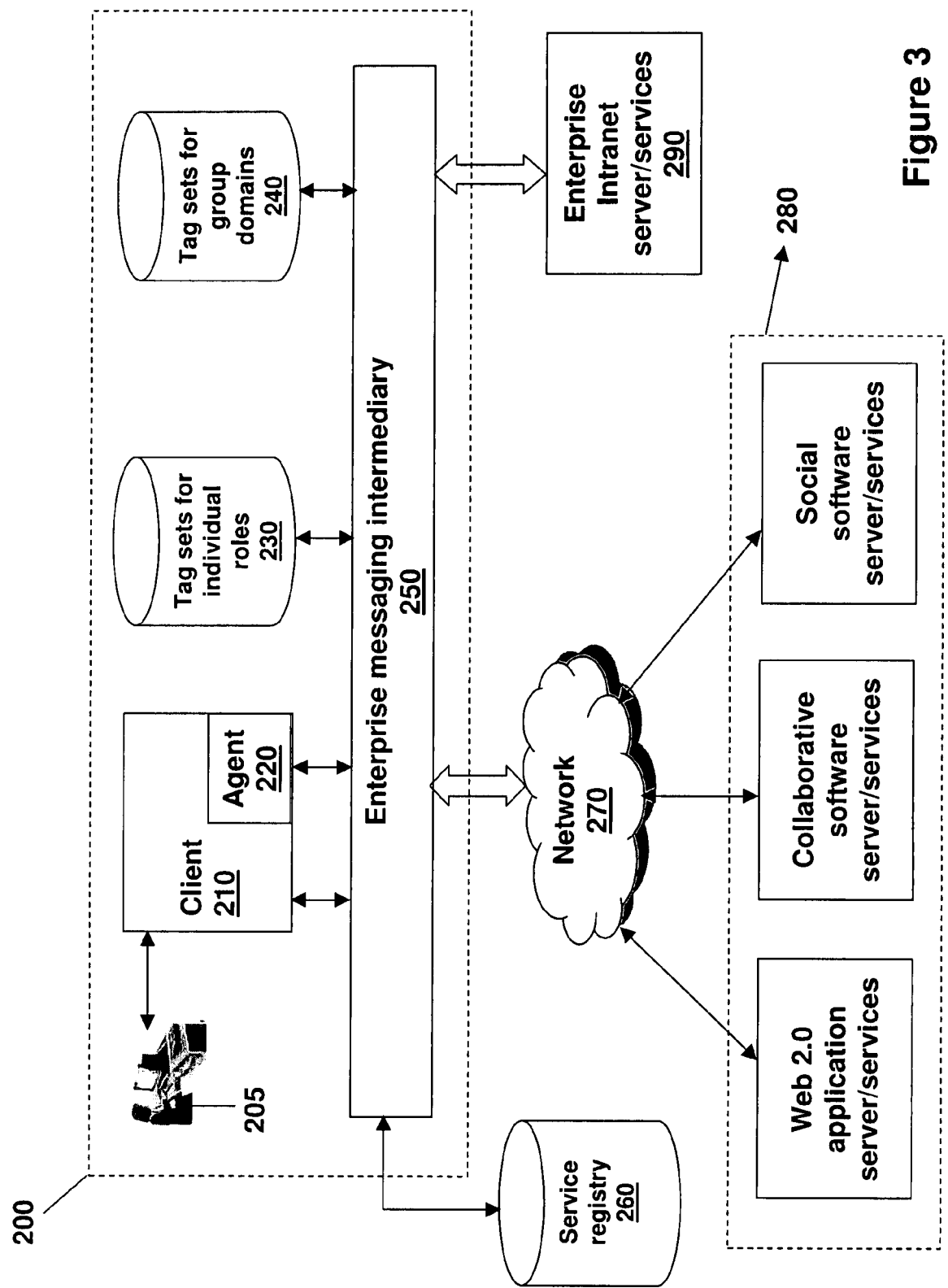
FIG. 3 is a block diagram illustrating an exemplary embodiment of a tag management system in accordance with the present invention implemented within an exemplary SOA.

Referring now to FIG. 3, a block diagram of an exemplary embodiment of a tag set manager system 200 in accordance with the present invention is illustrated. Tag set manager 200 can be implemented, for instance, within enterprise domain 114 of the SOA system of FIG. 2, to provide a mechanism for managing and maintaining separate, distinct sets of domain-specific tags for a client-side user 205 in an SOA environment that implements a methodology for providing client applications with access to a specified set of integrated tag-based services and processes that include features for collaborative tagging of web content. In the present exemplary embodiment, the user is operating a local computer running a portal client application 210 that provides a user interface implemented in accordance with the SOA and through which the user can access the applications that are specified by the SOA. In exemplary embodiments, the SOA specification may include Web 2.0 and other collaborative or social software applications such as, for example, del.icio.us, Flickr, Technorati, Last.fm, and Wrike. In the exemplary SOA of FIG. 3, the specification is shown as including Web 2.0 applications, collaborative software applications, and social software applications as provided by a number of web service providers 280 through a communications network 270, as well as including applications provided by a local Intranet service provider 290.

As shown in FIG. 3, managing system 200 includes a user or client-side agent or proxy 220 (for example, Firefox or Internet Explorer), a personal database management system 230, a group domain data management system 240, and a messaging intermediary 250. Databases 230, 240 may be any suitable type of data repository for storing, managing, and retrieving data that comprises sets of personal and domain-specific tags and other metadata associated with tag-based applications.

In exemplary embodiments, databases 230, 240 may be a relational or object-relational database management systems, such as DB2. In exemplary embodiments, the databases may be internal to local computer running a client application 210 or, alternatively, reside externally on a separate machine within the enterprise domain. In exemplary embodiments, client application 210 may employ a single personal database 230 to store tag sets for one or more roles and a jointly usable, domain-specific group database 240 to store tag sets for each group domain of which the user is a member (as shown in FIG. 3) or, alternatively, employ separate databases to store tag sets for each separate role and/or a separate user-specific group database to store tag sets for each group domain of which the user is a member.

In exemplary embodiments, each database can be configured to store a distinct tag set for one of a number of separate identities or roles that the user may desire to take on in the SOA environment. In this manner, the sets of tags could be maintained independently of any of the tag-based application provided for in the SOA. For example, the user may wish to have a tag set for a personal role that is maintained separately from a tag set for a separate role as a member of a group domain such as Community of Practice (CoP), which refers to a group that is composed of members who share a meaningful relationship and work together to expound their collective knowledge on a topic through collaboration to share ideas, find solutions, and build innovations. In this example, the CoP, to focus knowledge management in community, may wish to provide a pre-defined set of domain-specific tags for its members to employ when using tag-based collaborative or social software. The user, in a role as a member of a CoP, may thus desire to synchronize some of his or her tag sets with a specified set of domain-specific tags for the CoP for each of the tag-based application with which he or she is involved, while the user may wish to personally manage a separate set of tags for each or all of the tag-based services with which the user interacts in a personal role outside of the CoP. In exemplary embodiments, this functionality can be provided by agent 220, which can access the tag set databases over message intermediary 250.

In exemplary embodiments, the user's tag sets could be stored as directory entries according to the Lightweight Directory Access Protocol (LDAP), and the databases could be implemented as an LDAP directory. LDAP is an application protocol for querying and modifying directory services running over TCP/IP. LDAP directories comprise a set of objects with similar attributes organized in a logical and hierarchical manner as a tree of directory entries. Each directory entry has a unique identifier (identifying, for example, for one of the user's roles) and consists of a set of attributes (for example, the tag-based applications in the SOA and the tag sets for each of applications, along with additional metadata). The attributes each have a name and one or more values, and are defined in a schema.

In exemplary embodiments, agent 220 can be configured to, in response to commands from the user, initiate an LDAP session by connecting to one of the databases, send operation requests to the database, and receive responses sent from the database in return. Agent 220 can be configured to search for and retrieve tag entries associated with specific user roles and tag-based applications, compare tag terms and other attribute values, add, delete, modify the user's roles, tag sets, and tag and tag-based application attributes, import tags and tag sets from existing databases and directories, etc. By binding tag set attributes for each particular user role with a particular entry in an LDAP directory (or within an alternative data model or directory type), agent 220 can associate each particular role with content submitted or posted in that specific role so that it can be used consistently whenever tags are posted by the user or whenever tags that have already been posted by the user are detected.

In the present exemplary embodiment, agent 220 is a self-contained, interactive object configured to execute concurrently with client application 210 to act on behalf of the user running client application 220. In exemplary embodiments, agent 220 can be configured to provide a user interface through which the user can interact with the agent to instruct it to perform desired functionality. For example, agent 220 can be implemented as a web browser that enables the user to display and interact with text, images, and other information at each of the tag-based applications provided for in the SOA. In another example, client application 210 can comprise a web browser, and agent 220 can be implemented as a browser applet such as an Adobe Flash or Java application to provide part of or the entire user interface. In exemplary embodiments, agent 220 can be implemented according to the WS-CAF web service standard to provide composite functionality of each of the tag-based applications specified in the SOA through the user interface.

In the present exemplary embodiment, when client application 210 or agent 220 needs to invoke a remote application server, the invoking application generates a request message describing arguments to be given to an application specified in the SOA, and requests processing by the application. Messaging intermediary 250, which comprises a communications middleware component supporting a variety of communications paradigms, APIs, platforms, and standard protocols, receives the request message from the invoking application, processes the message in accordance with specified business rules and provisions, determines the location of the requested service provider (for example, by accessing service registry 260), and sends the message to the appropriate service provider. In exemplary embodiments, messaging intermediary 250 can be configured based upon standards such as XML, SOAP, UDDI, and WSDL. Upon receiving the request message, application server 120 performs the processing for the requested web services, and returns a response message describing any return values of the processing to message intermediary 250, which in turn returns the response message to the invoking application.

Messaging intermediary 250, which can be a component of an enterprise service bus such as ESB 116 of FIG. 2, is configured to transform message formats between clients and service providers, route requests to the correct service providers, and convert transport protocols between clients and providers. For example, if a service provider expects encrypted messages, message intermediary 250 can include such capability in request messages sent to that provider. Messaging intermediary 250 can be configured to provide virtualization of the applications according to rule and specifications of the SOA to client application 210 and agent 220, allowing the logic of those applications to be developed and managed independently of the infrastructure, network, and other provisions of the services specified in the SOA. In this manner, messaging intermediary 250 can help promote loose coupling between client application 210 and the service providers.

In the present exemplary embodiment, message intermediary 250 and service providers 280 communicate with each other through network 270. Network 270 is configured to receive and pass on request and response messages accordingly, and to use the transportation protocol or protocols used by messages. Network 270 includes intranets, extranets, and the Internet, and may contain any number of network infrastructure elements including routers, switches, gateways, etc. For example, network 270 may be the public Internet or a private LAN. In the present exemplary embodiment, message intermediary also communicates with Intranet service provider 290 according to transportation protocols specified for the local domain. In exemplary embodiments, as specified by the SOA, message intermediary 250 may also communicate with other web service providers to provide other web services and applications through network 280 to client application 210, as well as with other local domain service providers that provide other services and processes such as enterprise legacy services to the client application.

In the present exemplary embodiments, agent 220 is configured to act on instructions provided by the user to access a database through message intermediary 250 to load a set of tags that corresponds to a tag-based application specified by the user and a role specified by the user, display the first set of tags to the user, and to communicate with the service specified by the user to post tags selected by the user from the displayed set of tags to content at the service. In exemplary embodiments, agent 220 can provide a seamless user experience by not requiring multiple logins. At the time the user logs in to agent 220, the user can specify a role (for example, the user can connect to the agent in a personal role or as a member of a group domain such as a CoP). Agent 220 is configured to be aware of each of the tag-based applications that client application 210 may access through the SOA, as well as each specified role that the user may desire to use when logging in to the agent. In exemplary embodiments, agent 220 can be configured to supply any necessary login information to connect to each of the tag-based applications specified by the SOA on behalf of the user, in each of the specified roles for the user. In exemplary embodiments, when the user logs into the agent, the agent can then either automatically log the user into all of the tag-based applications specified by the SOA or automatically log the user into and out of each of the tag-based applications at separate times as desired by the user.

In the present exemplary embodiment, because agent 220 has access to each set of tags maintained for the user in databases 230, 240 over message intermediary 250, the agent can be configured to allow for dynamic management of the tag sets, such as by adding, deleting, or renaming tags. In exemplary embodiments, the user, or, for a group domain, the domain administrators or knowledge engineers, could be responsible for creating the initial taxonomy or folksonomy for a tag set, as well as any further management of the tag set after it has been created. In exemplary embodiments, agent 220 can be implemented to provide authorization procedures for controlling who may create and manipulate tag sets for various roles. The master tag set for the user's personal (non-group) roles would be maintained in database 230, and the master tag set for each group domain of which the user is a member can be maintained in a single, separate database such as database 240.

In exemplary embodiments, to ensure consistency of the sets of tags maintained for the user across each tag-based application provided for in the SOA, agent 220 can be configured to synchronize the current taxonomy of each separate tag set that is maintained for the user with any prior tags the user had created to describe web content at the tag-based application corresponding to that tag set. That is, once the user is satisfied with the consistency of the set of tags that the user has created or modified for a specific role, the tags could then be updated in a one-way synchronization in all of the tag-based applications provided for in the SOA with which the user was involved or as otherwise desired by the user. This would provide the user with a consistent set of tags for web content across all tag-based applications of the SOA in that role and allow the use or other members of a group domain to, for example, make meaningful web feed queries to aggregate content across these applications.

In exemplary embodiments, agent 220 can perform synchronization operations by mining the tag sets of each of the tag-based applications of which the agent is aware, and then accessing each tag-based application to update each prior tag created by the user in the specified role for objects or web content within that tag-based application with the new tag set now maintained in one of the databases. In exemplary embodiments, agent 220 can perform this by first loading the new tag sets for each of the tag-based applications for the user in the specified role, then comparing the new tag set for each tag-based application with each prior tag created by the user in the specified role at that tag-based application, and finally performing a one-way synchronization of the tags from the tag sets maintained at the client-side to each of the registered applications.

In exemplary embodiments, agent 220 can be also configured to configured to perform other synchronization operations on the user's tag set such as synchronizing separate tag sets maintained for separate user roles but corresponding to the same tag-based application, synchronizing a domain-specific tag set with other tag sets for the user, or with the tag sets of a group domain or CoP. In various exemplary embodiments, agent 220 can be configured to perform the synchronization periodically at regular intervals, when initiated by the user or a domain expert, or whenever the user logs in as a specific role or to one of the tag-based services provided for in the SOA.

In exemplary embodiments, the user can login to agent 220 as and assume more than one specified role during a session. To enable a user to posts tags to tag-based applications using multiple roles concurrently in a single session, agent 220 can perform role-based session management on the client-side by placing additional identifier metadata that specifies the actively-tagging role for the user on the tags as they are published to tag-based applications. The identifier metadata must be unique for each role to prevent occurrences of incidental collision with tags in other roles. Agent 220 can do this, for example, by utilizing role-identifying suffixes or prefixes in a manner similar to that of an XML Namespace. In this way, two identically named tags from different tag sets can be made to be semantically different by specifying metadata that would differentiate the two tags according to role. In situations in which the identical tag term has been posted from the tag sets of distinct roles for the user for the same tag-based application and would otherwise appear ambiguous to agent 220 as to the user role under which it was posted, by adding this specifying metadata to the tags as they are posted, the agent will be able to correctly identify the role under which the user posted a tag by accessing this metadata.

As an example, in a situation where the user logs in as the domain administrator for a CoP, the user has access to domain-specific tags that are particular to that CoP. To ensure that the available tags in this role do not conflict with any other tags in the user's other roles without requiring separate login sessions for the different roles in each tag-based application, agent 220 could add metadata to the tags posted by the user so the tags are suffixed or prefixed with an identifier that is unique to a specific role.

Moreover, in exemplary embodiments, agent 220 can place other metadata that specifies additional information on the tags as they are published to tag-based applications. For example, metadata specifying which tag-based application a particular tag pertains, the type of content that is tagged, the owner of the content that is tagged, tagging categories, etc. can be encoded for each tag. In exemplary embodiments, this could involve appending metadata to a tag (or to a composite tag having role-identifier metadata already appended) with an identifier that is uniquely-specified for the tag-based application to which the tag is posted. In this way, two identically named tags in different tag sets for the user can be made to be semantically different by specifying metadata that would differentiate them according to application.

In exemplary embodiments, the additional metadata encoding or identifiers placed by agent 220 on tags can be presented transparently to the user operating the agent so that the user will be able to identify and manage his or her tags according to role or other information specified by the metadata. In alternative exemplary embodiments, agent 220 can be configured such that any additional metadata encoding or identifiers are nontransparent when tags are presented to the user. In such embodiments, the tag terminology will appear to the user without the additional information as it did when created, but when agent 220 posts or synchronizes these tags to the tag-based applications specified in the SOA, the agent can prefix or suffix these tags with metadata that specifies additional information.

In exemplary embodiments, agent 220 could also be configured to provide a user interface window or menu such as, for example, a dashboard, to a user or CoP administrator to allow for monitoring and mining of data regarding the use of the tag sets across the various tag-based applications to enable identification of trends and patterns. The user interface could be capable of, for example, performing various queries on tagging operations that have been performed (for example, data on the number of tags left by users, how users use tags, regularities in user activity, tag frequencies, kinds of tags used, etc.). In exemplary embodiments, this information could be used to dynamically create and modify aspects of the dashboard and/or tag sets. For example, the collected information could be used to refine tag set taxonomy, to determine connections between related content, or to "rank" content based upon its perceived utility based upon usage patterns.

In exemplary embodiments, agent 220 could also be configured to provide an applet or a user interface window to a user or group domain administrator that allows for clean-up of any tag set inconsistencies or other aspects that may lead to unreliable tagging. Such inconsistencies may arise, for example from polysemy (the use of words that have multiple related meanings), synonyms (multiple words with the same or similar meanings), and word inflections (such as with plural forms). In exemplary embodiments, agent 220 may be configured to with a lemmatization engine or to perform word stemming.

In other exemplary embodiments, agent 220 could be configured to maintain a table of synonym tags for a particular tag and to provide the table to the user to allow the user to select a desired tag term to always use for the same or similar meanings. The synonym table could be useful, for instance, the aid in finding appropriate tags for updating, finding particular content in one of the tag-based applications, or creating a new tag in a meaningful manner. This table could be constructed and modified, for example, by the user or domain administrators in a CoP. In exemplary embodiments, the synonym table could be constructed from scratch or, alternatively, agent 220 could be implemented with an initial version that could be updated by the user, domain administrators, or automatically within the agent using a tool that would dynamically construct the synonym table. In exemplary embodiments, the synonym table could be populated at runtime by inspection of tag relationships using predefined rules specified by, for example, an enterprise. In exemplary embodiments, agent 220 could be configured to be aware of the role of the user and to permit access to the synonym table based upon the role of the user, such as whether the user is logged-in in a domain administrator role for a CoP synonym table. In exemplary embodiments, the synonym table could be configured to employ a counter to indicate or rank, for a given set of synonyms, which synonym is the best match based upon previous heuristics.

In exemplary embodiments, agent 220 can be utilized by a domain administrator, based upon information collected in data queries, to implement a collabulary for a CoP's tag sets. A collabulary can be defined as a common vocabulary used to categorize content, and in particular, one created in collaboration with classification experts to ensure relevance and consistency. A collabulary can be conceptualized as a compromise between a taxonomy and a folksonomy in which domain administrators collaborate with group members to create rich, but more systematic content tagging systems. This can result is a system that combines the benefits of folksonomies—low entry costs, a rich vocabulary that is broadly shared and comprehensible by the user base, and the capacity to respond quickly to language change—without the errors that inevitably arise in naive, unsupervised folksonomies.

Exemplary embodiments can therefore be implemented as described above to enable a body of information to be increasingly easy to search, discover, and navigate over time using role-based tag sets to label, classify, and retrieve content. Collaborative tagging in this manner can, for example, provide a simple way for users to group bookmarks together and then share these grouped links with colleagues. One employee can retrieve the groups of links saved by another employee through many different routes. A related group can also be delivered to another user at the point of need, that is, when they are looking for related information. Because the tag sets are user-generated and therefore inexpensive to implement, they can provide a low-cost alternative to corporate taxonomies or controlled, hierarchical vocabularies and exemplary embodiments can be used extend tagging and social bookmarking into the business arena, with the addition of project groups to allow users to collaborate across boundaries. Exemplary embodiments of the present invention can be implemented to provide functionality for tagging of both structured and unstructured content and thereby provide for easier managing of the capture, storage, security, revision control, retrieval, distribution, preservation, and destruction of documents and content. Exemplary embodiments can therefore be implemented to enable an organization, such as a business or governmental agency, to more effectively meet business goals.

The capabilities of exemplary embodiments of present invention described above can be implemented in software, firmware, hardware, or some combination thereof, and may be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. Exemplary embodiments of the present invention can also be embedded in a computer program product, which comprises features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided.

For instance, exemplary embodiments of the present invention can be implemented within the exemplary embodiment of a hardware configuration provided for a computer system in FIG. 1. The above-described program or modules implementing exemplary embodiments of the present invention can work on processing unit 4 and the like to perform tag management. The program or modules implementing exemplary embodiments may be stored in an external storage medium. In addition to system memory 50, an optical recording medium such as a DVD and a PD, a magneto-optical recording medium such as a MD, a tape medium, a semiconductor memory such as an IC card, and the like may be used as the storage medium. Moreover, the program may be provided to data processing system 15 through the network by using, as the recording medium, a storage device such as a hard disk or a RAM, which is provided in a server system connected to a dedicated communication network or the Internet.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A tag management system for a user of a client-side portal application providing access to a set of services that include provisions for collaborative tagging of content, the tag management system comprising:

a computer having processor and a memory;

one or more data repositories stored in the memory and configured to maintain one or more separate sets of tags for the user, the sets of tags including a set of tags corresponding to each service of the set of services in each role of one or more user roles and specifying available vocabulary which is used to tag content at a user specified service and a user specified role, wherein content is tagged with words contained in the available vocabulary for the user specified service and the user specified role;

a client-side agent; and a messaging intermediary in communication with the one or more data repositories and configured to provide access to the one or more data repositories and to provide for communication with the set of services and to transfer message formats and to convert transport protocols between the client-side agent and the one or more data repositories; and wherein the client-side agent is configured to communicate with the set of services and access the one or more data repositories through the message intermediary to act on behalf of the user in the one or more user roles, the agent being configured to act on instructions provided by the user to access the one or more data repositories to load a first set of tags corresponding the user-specified service and the user-specified role, display the first set of tags to the user, and to communicate with the user-specified service to post tags selected by the user from the first set of tags to content at the user-specified service.

2. The system of claim 1, wherein the agent is configured to access the one or more data repositories and act on user instructions to provide for dynamic management of the sets of tags.

3. The system of claim 1, wherein the agent is configured to act on instructions provided by the user to access the one or more data repositories and communicate with the set of services to synchronize a first set of tags posted by the user to content at the set of services with a second set of tags that corresponds to the user-specified service at which the tag was posted and the user-specified role in which the tag was posted such that all tags in the first set of tags are included in the second set of tags.

4. The system of claim 1, wherein the agent is configured to act on instructions provided by the user to access the one or more data repositories to synchronize a first set of tags maintained for the user corresponding to a first service of the set of services and a first user role with a second set of tags maintained for the user corresponding to a second service of the set of services and the first user role such that all tags in the first set of tags are included in the second set of tags.

5. The system of claim 1, wherein the agent is configured to act on instructions provided by the user to access the one or more data repositories to synchronize a first set of tags maintained for the user corresponding to a first service of the set of services and a first user role with a second set of tags maintained for the user corresponding to the first service of the set of services and a second user role such that all tags in the first set of tags are included in the second set of tags.

6. The system of claim 1, wherein the one or more data repositories comprise one or more separate, user-specific data repositories having a user-specific data repository corresponding to each user role that is specific to the user and maintaining the sets of tags corresponding to each service in that role.

7. The system of claim 6, wherein at least one role of the one or more user roles is a domain-specific role that the user shares with members of a group domain of which the user is a member.

8. The system of claim 7, wherein the one or more data repositories comprise one or more domain-specific data repositories having a domain-specific data repository corresponding to each domain-specific role that the user shares with members of a group domain.

9. The system of claim 8, wherein the agent is configured to act on instructions provided by the user to access a first user-specific data repository of the one or more user-specific data repositories and a first domain-specific data repository of the one or more domain-specific data repositories to synchronize the sets of tags maintained for the user in the first user-specific data repository with the sets of tags maintained for the user in the first domain-specific data repository such that all tags in the sets of tags maintained for the user in the first domain-specific data repository are included in the set of tags maintained for the user in the first user-specific data repository.

10. The system of claim 8, wherein the one or more user roles comprise a domain-specific role that the user shares with members of a community of practice.

11. The system of claim 8, wherein the agent is configured to provide authorization procedures for controlling access to the one or more domain-specific data repositories.

12. The system of claim 1, wherein the agent is configured to supply any login information necessary for connecting the user to each service in each role of the one or more user roles.

13. The system of claim 10, wherein the agent is configured to permit the user to login to the agent in each role of the one or more user roles, and wherein the agent is configured upon login of the user to the agent to automatically log the user in to each service of the set of services in the role in which the user has logged-in to the agent.

14. The system of claim 13, wherein the agent is configured to permit the user to login to the agent in more than one role of the one or more user roles concurrently.

15. The system of claim 14, wherein the agent is configured to place metadata on each tag selected by the user to post to at the set of services.

16. The system of claim 15, wherein the metadata placed on each tag comprises a unique indicator of the user-specified role in which the tag was posted.

17. The system of claim 15, wherein the metadata placed on each tag comprises a unique indicator of the user-specified service at which the tag was posted.

18. The system of claim 1, wherein the agent is configured to provide an agent graphical user interface (GUI) through which the user can interact with the agent to instruct to the agent to perform desired operations.

19. The system of claim 18, wherein the agent GUI is configured to provide a GUI window permitting the user to instruct the agent to perform data monitoring and mining operations of tags posted to content on the set of services.

20. The system of claim 1, wherein the messaging intermediary comprises a communications middleware component supporting a plurality of communications paradigms, APIs, platforms, and standard protocols.

* * * * *